(12) United States Patent
Okuma (10) Patent No.: US 12,529,576 B2
(45) Date of Patent: Jan. 20, 2026

(54) LANE ESTIMATION APPARATUS AND MAP GENERATION APPARATUS

(71) Applicant: Honda Motor Co., Ltd., Tokyo (JP)

(72) Inventor: Yuki Okuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 18/519,296

(22) Filed: Nov. 27, 2023

(65) Prior Publication Data
US 2024/0175707 A1 May 30, 2024

(30) Foreign Application Priority Data
Nov. 30, 2022 (JP) .................. 2022-191424

(51) Int. Cl.
*G01C 21/00* (2006.01)
(52) U.S. Cl.
CPC ..... *G01C 21/3822* (2020.08); *G01C 21/3837* (2020.08)
(58) Field of Classification Search
CPC .......... G01C 21/3822; G01C 21/3837
USPC ........................................ 701/430
See application file for complete search history.

(56) References Cited

U.S. PATENT DOCUMENTS

| | | | |
|---|---|---|---|
| 2010/0057336 A1* | 3/2010 | Levine | G08G 1/096816 |
| | | | 701/532 |
| 2010/0246889 A1* | 9/2010 | Nara | G06V 20/588 |
| | | | 382/104 |
| 2019/0310100 A1* | 10/2019 | Yang | G01C 21/3461 |
| 2023/0041319 A1* | 2/2023 | You | G08G 1/096791 |
| 2023/0274636 A1* | 8/2023 | Akella | B60W 60/00274 |
| | | | 701/117 |

FOREIGN PATENT DOCUMENTS

JP 2010221859 A 10/2010

* cited by examiner

*Primary Examiner* — Mahmoud S Ismail
(74) *Attorney, Agent, or Firm* — Duft & Bornsen, PC (57) ABSTRACT

A lane estimation apparatus including an external circumstance detection part detecting an external circumstance around a subject vehicle, and an electronic control unit including a microprocessor. The microprocessor is configured to perform estimating a current lane in which the subject vehicle travels, based on the external circumstance detected by the external circumstance detection part, and the estimating including estimating a time-based current lane every a predetermined time when the subject vehicle travels in a predetermined section, calculating a parameter indicating a frequency of the time-based current lane after traveling of the subject vehicle in the predetermined section, and estimating the current lane in which the subject vehicle has traveled in the predetermined section, based on the parameter.

11 Claims, 8 Drawing Sheets

(1) MAP GENERATION  (2) INFORMATION EXTRACTION  (3) INFORMATION ADDITION

FIRST METHOD

FIG. 6B

SECOND METHOD

FIG. 6C

THIRD METHOD

FIG. 6D

THIRD METHOD

FIG. 7

| REQUIREMENT | FIRST METHOD | SECOND METHOD | THIRD METHOD | ACCURACY AFTER COMBINATION PROCESSING | ACCURACY AFTER STATISTICAL PROCESSING |
|---|---|---|---|---|---|
| LANE AND ROAD SHOULDER ARE IDENTIFIABLE | ○ | × | △ | ○ | ○ |
| NO INFLUENCE IS RECEIVED FROM PARKED VEHICLE | ○ | × | ○ | ○ | ○ |
| OPOSITE LANE IS DETERMINABLE | ○ | ○ | △ | ○ | ○ |
| ESTIMATION IS ENABLE EVEN IN ENVIRONMENT WITH NO DIVISION LINE OR NO OTHER VEHICLE | × | × | ○ | ○ | ○ |
| INDEPENDENT OF NUMBER OF LANES OR LOCATION OF TRAVELING LANE | △ | × | × | △ | △ |
| THERE IS LITTLE ERRONEOUS ESTIMATION | △ | ○ | ○ | ○ | ○ |
| THERE IS FEW UNDEFINED VALUE | ○ | × | × | △ | ○ |
| ROBUST PERFORMANCE AGAINST TEMPORARY ERRONEOUS RECOGNITION | × | × | × | △ | ○ |

LANE ESTIMATION APPARATUS AND MAP GENERATION APPARATUS

CROSS-REFERENCE TO RELATED APPLICATION

This application is based upon and claims the benefit of priority from Japanese Patent Application No. 2022-191424 filed on Nov. 30, 2022, the content of which is incorporated herein by reference.

BACKGROUND OF THE INVENTION

Field of the Invention

This invention relates to a lane estimation apparatus estimating a traveling lane in which a subject vehicle travels, and a map generation apparatus.

Description of the Related Art

At this type of apparatus, conventionally, there is a known apparatus in which a white line dividing a current traveling lane of a subject vehicle is extracted by a camera mounted on a vehicle, and a type of the white line is recognized to estimate the traveling lane of the subject vehicle. Such an apparatus is disclosed, for example, in Japanese Unexamined Patent Publication No. 2010-221859 (JP2010-221859A). In the apparatus disclosed in JP2010-221859A, the current traveling lane of the subject vehicle at a branch portion is estimated based on whether the subject vehicle steps over the white line, a type of the white line stepped over, and a type of the branch specified by a map data.

However, there is a case where the camera cannot recognize whether the subject vehicle steps over the white line. It is desirable to be able to accurately estimate the traveling lane under various travel environments.

SUMMARY OF THE INVENTION

An aspect of the present invention is a lane estimation apparatus, including an external circumstance detection part detecting an external circumstance around a subject vehicle, and an electronic control unit including a microprocessor and a memory connected to the microprocessor. The microprocessor is configured to perform estimating a current lane in which the subject vehicle travels, based on the external circumstance detected by the external circumstance detection part, and the estimating including estimating a time-based current lane every a predetermined time when the subject vehicle travels in a predetermined section, calculating a parameter indicating a frequency of the time-based current lane after traveling of the subject vehicle in the predetermined section, and estimating the current lane in which the subject vehicle has traveled in the predetermined section, based on the parameter.

Another aspect of the present invention is a map generation apparatus, including the lane estimation apparatus described above. The microprocessor is configured to perform generating a map around the subject vehicle based on the external circumstance detected by the external circumstance detection part.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 10B. A map generation apparatus according to an embodiment of the invention is configured to generate a map used, for example, when a vehicle having a self-driving capability, i.e., self-driving vehicle travels. The vehicle having the map generation apparatus may be sometimes called "subject vehicle" to differentiate it from other vehicles.

The map generation apparatus generates the map when the subject vehicle is manually driven by a driver. Therefore, the map generation apparatus is provided with a manual driving vehicle not having the self-driving capability. The map generation apparatus can be provided with not only the manual driving vehicle, but also the self-driving vehicle capable of switching from a self-drive mode in which a driving operation by the driver is unnecessary to a manual drive mode in which the driving operation by the driver is necessary. In the following, an example of the map generation apparatus provided with the self-driving vehicle will be described.

Figure 1:
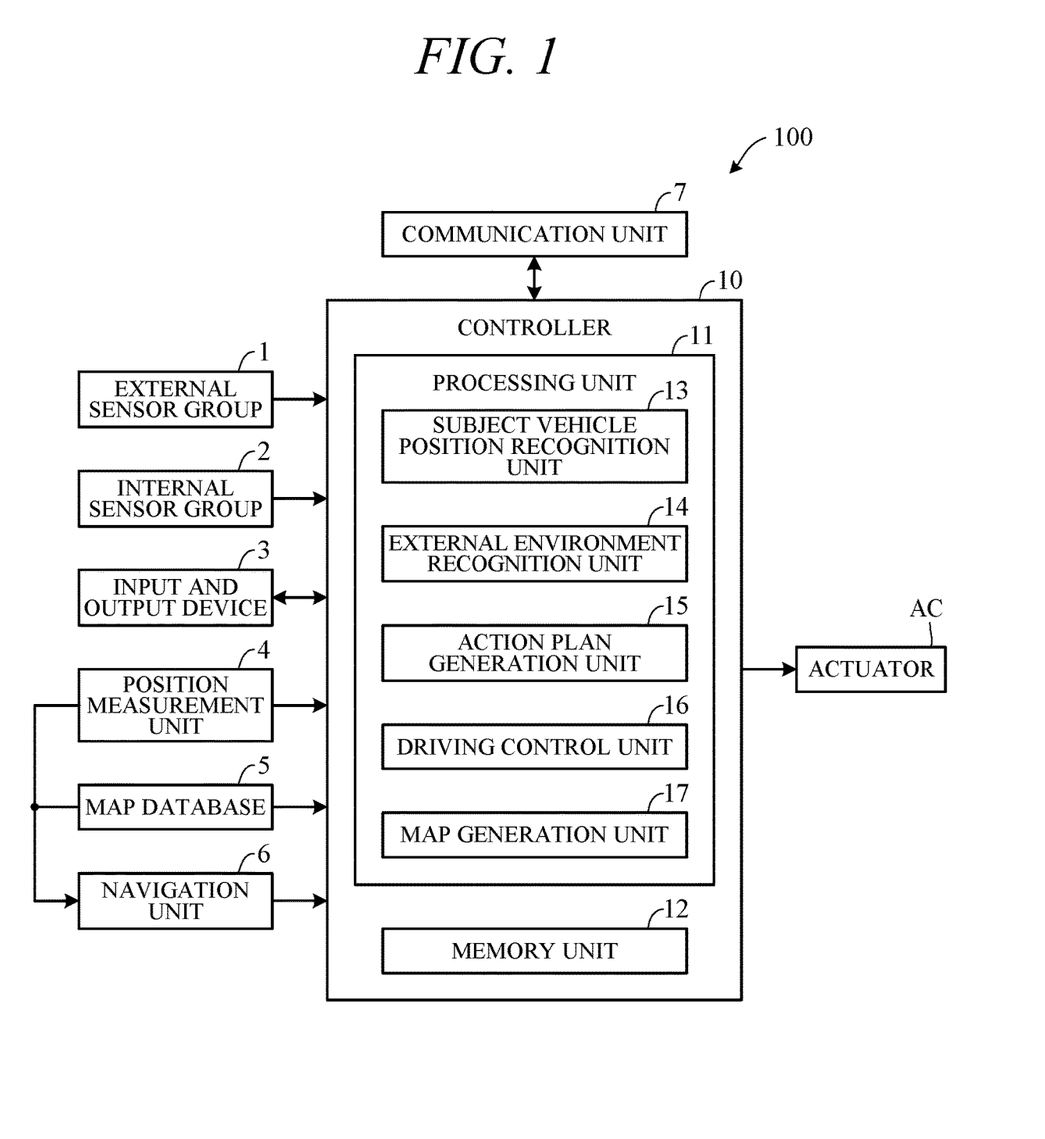
FIG. 1 is a block diagram schematically illustrating an overall configuration of a vehicle control system having a map generation apparatus according to an embodiment of the present invention.

First, a configuration of the self-driving vehicle will be explained. The subject vehicle is an engine vehicle having an internal combustion engine (engine) as a travel drive source, electric vehicle having a travel motor as the travel drive source, or hybrid vehicle having both of the engine and the travel motor as the travel drive source. FIG. 1 is a block diagram schematically illustrating an overall configuration of a vehicle control system 100 of the subject vehicle having the map generation apparatus according to an embodiment of the present invention.

As shown in FIG. 1, the vehicle control system 100 mainly includes a controller 10, and an external sensor group 1, an internal sensor group 2, an input and output device 3, a position measurement unit 4, a map database 5, a navigation unit 6, a communication unit 7 and actuators AC for traveling which are communicably connected with the controller 10.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging surroundings of the subject vehicle (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, and the like. The internal sensor group 2 also includes sensors for detecting driver driving operations in manual drive mode, including, for example, accelerator pedal operations, brake pedal operations, steering wheel operations and the like.

The term input and output device 3 is used herein as a collective designation encompassing apparatuses receiving instructions input by the driver and outputting information to the driver. The input and output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The position measurement sensor may be included in the internal sensor group 2. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data (map information) used by the navigation unit 6 and is, for example, implemented using a magnetic disk or semiconductor element. The map data includes road position data, road shape (curvature etc.) data, number of panes data, and intersection, road junction and road branch position data, etc. The map data stored in the map database 5 is versatile SD map (Standard Map) data, i.e., simple map data, and is different from high-accuracy map data stored in a memory unit 12 of the controller 10.

The navigation unit 6 retrieves target road routes to destinations input by the driver and performs guidance along selected target routes. Destination input and target route guidance is performed through the input and output device 3. Target routes are computed based on current position of the subject vehicle measured by the position measurement unit 4 and map data stored in the map database 5. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information, traffic data and the like, periodically or at arbitrary times. The networks include not only public wireless communications network, but also closed communications networks, such as wireless LAN, Wi-Fi and Bluetooth, which are established for a predetermined administrative area. Acquired map data are output to the map database 5 and/or memory unit 12 via the controller 10 to update their stored map data. The subject vehicle can also acquire traffic information such as traffic jam information, accident information and construction information by communicating with an external server device through the communication unit 7.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and a turning actuator for driving a turning device.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information). This road map information includes information on road position, information on road shape (curvature, etc.), information on gradient of the road, information on position of intersections and branches, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information acquired from the outside of the subject vehicle through the communication unit 7, for example, information of a map (called a cloud map) acquired through a cloud server, and map information created by the subject vehicle itself using the detection values of the external sensor group 1 or the detection values of the external sensor group 1 and the internal sensor group 2, for example, information of a map (called an environment map) consisting of point cloud data generated by mapping using a technique such as SLAM (Simultaneous Localization and Mapping).

The processing unit 11 functions as a subject vehicle position recognition unit 13, an external environment recognition unit 14, an action plan generation unit 15, a driving control unit 16, and a map generation unit 17, by executing a program previously stored in the memory unit 12.

The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. Optionally, when the subject vehicle position can be measured by sensors installed externally on the road or by the roadside, the subject vehicle position can be recognized by communicating with such sensors through the communication unit 7.

The external environment recognition unit 14 recognizes external circumstances around the subject vehicle based on signals from cameras, LIDERs, RADARs and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road division lines (white lines, etc.) and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

The map generation unit 17 generates the environment map constituted by three-dimensional point cloud data using detection values detected by the external sensor group 1 during traveling in the manual drive mode. Specifically, an edge indicating an outline of an object is extracted from a camera image acquired by the camera based on luminance and color information for each pixel, and a feature point is extracted using the edge information. The feature point is, for example, points on the edges or an intersection of the edges, and corresponds to a division line on the road surface, a corner of a building, a corner of a road sign, or the like. The map generation unit 17 determines distances to the extracted feature points and sequentially plots the extracted feature points on the environment map by using the distances, thereby generating the environment map around the road on which the subject vehicle has traveled. The environment map may be generated by extracting the feature points of an object around the subject vehicle using data acquired by radar or LIDAR instead of the camera.

The subject vehicle position recognition unit 13 performs subject vehicle position estimation processing in parallel with map creation processing by the map generation unit 17. That is, the position of the subject vehicle is estimated based on a change in the position of the feature point over time. The map creation processing and the position estimation processing are simultaneously performed, for example, according to an algorithm of SLAM (Simultaneous Localization and Mapping) using signal from the camera or the LIDAR, or the like. The map generation unit 17 can generate the environment map not only when the subject vehicle travels in the manual drive mode but also when the subject vehicle travels in the self-drive mode. If the environment map has already been generated and stored in the memory unit 12, the map generation unit 17 may update the environment map with a newly obtained feature point.

Incidentally, there is a limit to the detection range by the external sensor group 1. Hence, it is difficult to grasp information of the traveling lane branching or joining ahead of the current location point only from the detection information of the external sensor group 1. For this reason, it is preferable that information of road structures such as branches and junctions included in the SD map or the like is added to map information including the point cloud data generated by the map generation unit 17, and this is stored as an environment map in the memory unit 12. In particular, in recent years, there has been a demand for sustainable transportation systems that give careful consideration also to vulnerable people among traffic participants through self-driving technology, and creation of a good environment map is desired in order to further improve traffic safety and convenience and contribute to development of sustainable transportation systems.

Figure 2:
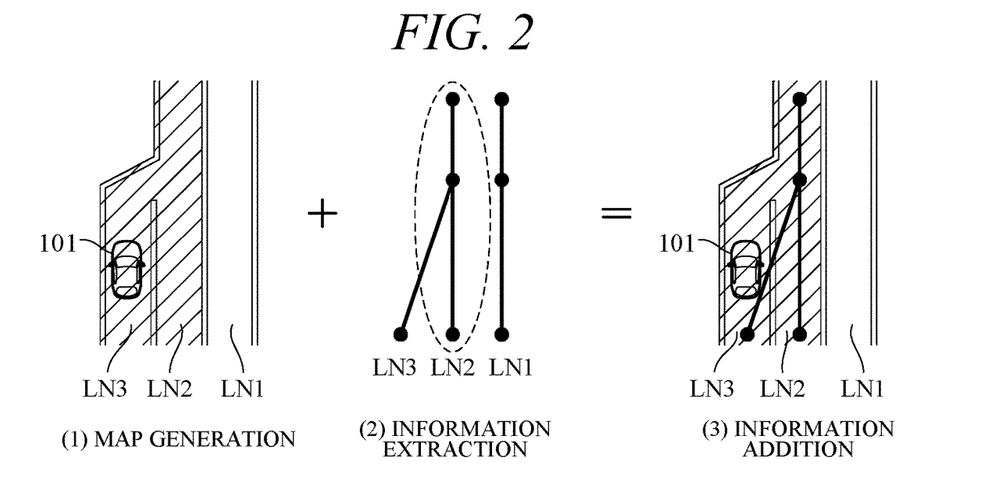
FIG. 2 is a diagram illustrating a specific procedure of map generation by the map generation apparatus in FIG. 1.

FIG. 2 is a diagram for describing a specific procedure of map generation by the map generation unit 17 in such a case. In FIG. 2, first, as map generation (1), an environment map in the surroundings of the subject vehicle 101 is generated, based on detection information of the external sensor group 1. In the illustrated example, the subject vehicle 101 is traveling in the third lane LN3 of a road including three lanes on each side (the first lane LN1, the second lane LN2, and the third lane LN3). An environment map including the current lane (the third lane LN3) and its adjacent lane (the second lane LN2) in an area indicated by hatching is generated.

Next, as information extraction (2), information of the SD map stored in the map database 5 is read. From such information, information of a road corresponding to the location of the subject vehicle 101, that is, information indicating a road structure is extracted. Specifically, the lane (the third lane LN3) in which the subject vehicle 101 is traveling is identified, and then the information of the road structure corresponding to the lane, that is, information of the third lane LN3 and the second lane LN2 corresponding to the environment map that is being generated is extracted. This information includes information indicating that the third lane LN3 will be joined to the second lane LN2 ahead of the current location point as indicated by a dotted line.

Finally, as information addition (3), the information indicating the road structure extracted in the information extraction (2) is added to the environment map generated in the map generation (1), and this is stored as a new environment map (environment maps of the second lane LN2 and the third lane LN3) in the memory unit 12. Accordingly, while the subject vehicle 101 is traveling in the third lane LN3, for example, by self-driving, the vehicle control system 100 (the controller 20) is capable of recognizing promptly that it is necessary to change lanes from the third lane LN3 to the second lane LN2 by using the map information stored in the memory unit 12. As a result, it becomes possible to determine promptly whether it is necessary to lower the automatic driving level, and in a case where it is necessary to lower the automatic driving level, it becomes possible to notify the occupant of the necessity promptly.

In this manner, in order to add the lane information extracted in the information extraction (2) to the environment map generated in the map generation (1), the environment map and the lane information have to be associated with each other. For this purpose, it is necessary to identify in which lane the subject vehicle 101 has been traveling while the environment map is being generated. However, the environment map includes the point cloud data. Hence, it is difficult to identify the lane in which the vehicle is traveling from the environment map. Therefore, in the present embodiment, the lane estimation apparatus is configured as follows so as to be capable of estimating the traveling lane of the subject vehicle 101 (i.e., current lane), while generating the environment map.

Figure 3:
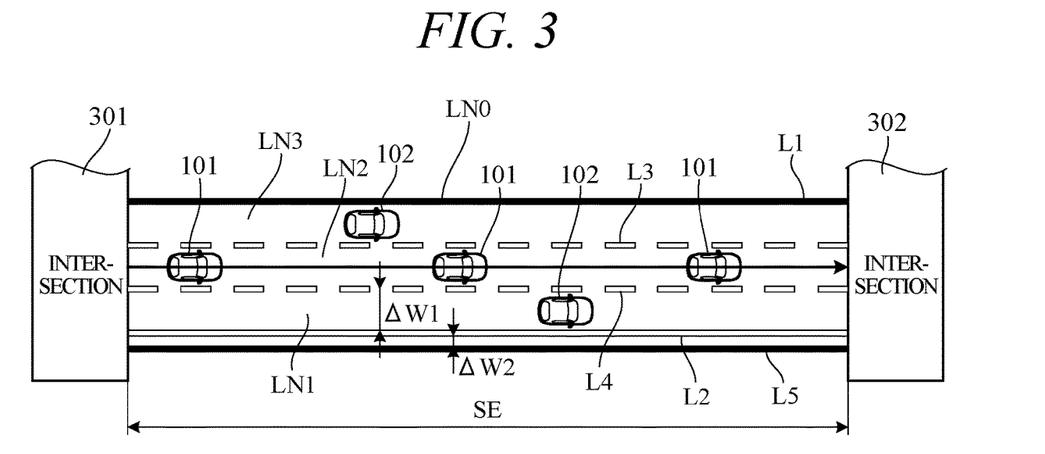
FIG. 3 is a diagram illustrating an example of a travel scene to which a lane estimation apparatus according to the embodiment of the present invention is applied.

FIG. 3 is a diagram illustrating an example of a traveling scene to which the lane estimation apparatus according to the embodiment of the present invention is applied. FIG. 3 illustrates a road of right-side traffic including a plurality of lanes (the first lane LN1, the second lane LN2, and the third lane LN3) respectively defined by division lines, and is an example of a road in the United States. The division lines include a division line L1 (a center line) at the center of the road, a division line L2 (a solid line) at an end of the road, and two division lines L3 and L4 (dotted lines) between the division lines L1 and L2. These division lines L1 to L4 extend in parallel with each other. The center line L1 is, for example, a yellow solid line, and there is an opposite lane on an opposite side (a left side) of the center line L1. The division lines L2 to L4 are white, and there is a road boundary line L5 on an outer side of the division line L2 (on an opposite side of the division line L4). Left-right lengths (lane widths ΔW1) of the lanes LN1 to LN3 are equal to one another. A left-right length ΔW2 between the division line L2 and the road boundary line L5 is shorter than the lane width ΔW1.

In FIG. 3, a plurality of locations of the subject vehicle 101 at different time points are indicated, and the subject vehicle 101 travels in the second lane LN2 as indicated by an illustrated arrow in a predetermined section SE along the road from an intersection 301 to an intersection 302. That is, in the following description, in order to simplify the description, it is assumed that the subject vehicle 101 travels along the road without changing lanes. The intersections 301 and 302 will be respectively referred to as a start point and an end point of the predetermined section SE, in some cases. In the first lane LN1 and the third lane LN3, other vehicles 102, which are traveling, are respectively present.

Figure 4:
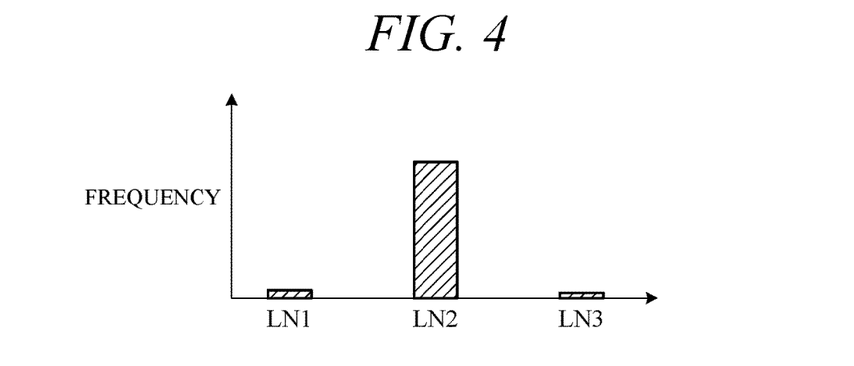
FIG. 4 is a diagram illustrating an example of a frequency of estimated lane.

An outline of the lane estimation apparatus according to the present embodiment will be described. When the subject vehicle 101 travels in the predetermined section SE while generating the environment map, the lane estimation apparatus firstly estimates the traveling lane (current lane) of the subject vehicle 101 every predetermined time by using three methods to be described later. That is, the traveling lane (time-based current lane) is estimated at a plurality of location points by using the three methods. Then, frequencies of traveling lanes estimated at a plurality of location points are obtained at the end point (the intersection 302) of the predetermined section SE. FIG. 4 is a diagram illustrating an example of the frequencies of the lanes obtained in FIG. 3. In the example illustrated in FIG. 4, the frequency of the second lane LN2 is the highest. Accordingly, the lane estimation apparatus estimates that the second lane LN2 is the lane in which the subject vehicle 101 has traveled in the predetermined section SE.

Figure 5:
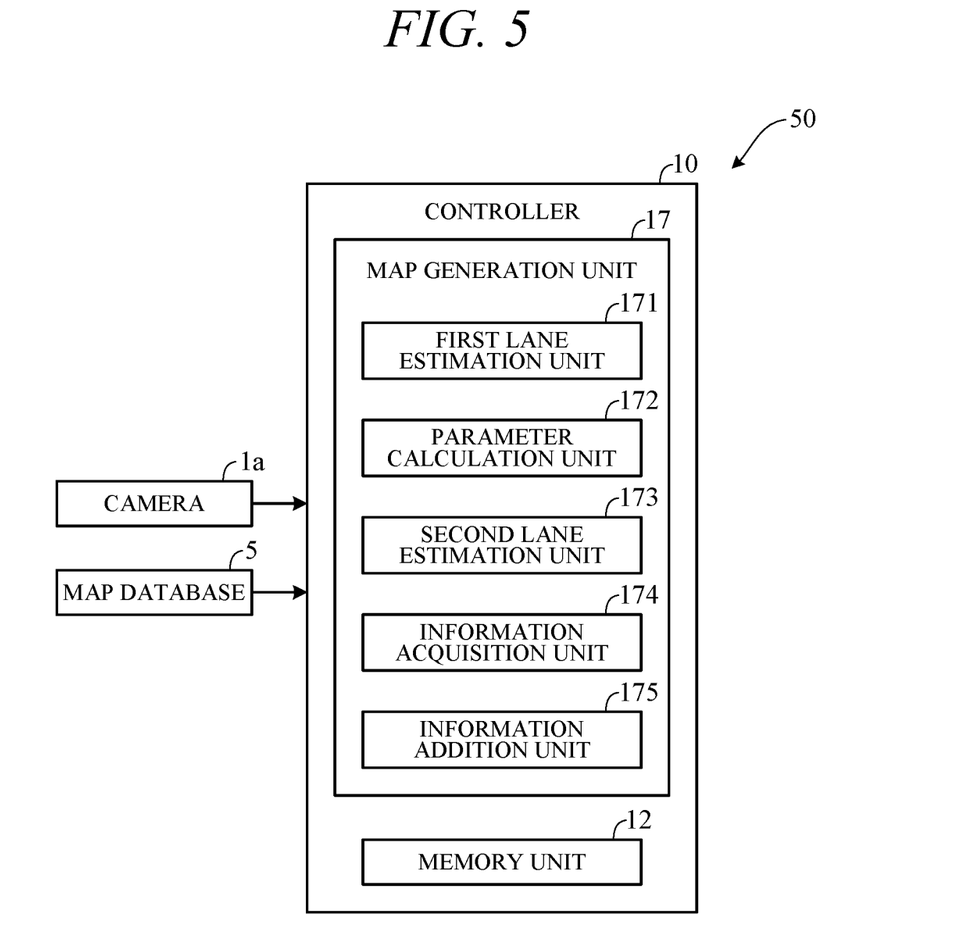
FIG. 5 is a block diagram illustrating a main configuration of the map generation apparatus according to the embodiment of the present invention.

FIG. 5 is a block diagram illustrating the configuration of main parts of a map generation apparatus 50 according to the embodiment of the present invention. The lane estimation apparatus of the present embodiment is included in this map generation apparatus 50. The map generation apparatus 50 is included in the vehicle control system 100 in FIG. 1. As illustrated in FIG. 5, the map generation apparatus 50 includes a controller 10, a camera 1a and the map database 5. Signals from the camera 1a and the map database 5 are input to the controller 10.

The camera 1a is a monocular camera having an imaging element (image sensor) such as a CCD or a CMOS, and included in the external sensor group 1 in FIG. 1. The camera 1a may be a stereo camera. The camera 1a is attached to, for example, a predetermined position in the front portion of the subject vehicle 101, continuously captures an image of a space in front of the subject vehicle 101, and acquires an image (camera image) of a target object. The target object includes the division line on a road surface. A plurality of cameras 1a may be provided so as to capture images in a plurality of directions. Instead of the camera 1a or in addition to the camera 1a, a detection part such as a LIDAR may be used to detect a target object.

The controller 10 in FIG. 5 has the map generation unit 17 and the memory unit 12 in FIG. 1. The map generation unit 17 includes a first lane estimation unit 171, a parameter calculation unit 172, a second lane estimation unit 173, an information acquisition unit 174 and an information addition unit 175 other than the function of generating the environment map while traveling, as functional configurations of the processing unit 11 (FIG. 1). The first lane estimation unit 171, the parameter calculation unit 172 and the second lane estimation unit 173 function as a lane estimation part. Since the lane estimation part can be used for recognizing the position of the subject vehicle, the lane estimation part (first lane estimation unit 171, parameter calculation unit 172 and second lane estimation unit 173) may be included in the subject vehicle position recognition unit 13 not in the map generation unit 17.

The first lane estimation unit 171 estimates the lane in which the subject vehicle 101 is traveling, that is, the current lane every predetermined time, while the subject vehicle 101 is traveling in the predetermined section SE, based on a signal from the camera 1a. This estimation is performed by using the following three methods. In a first method, the current lane is estimated, based on division line information indicating presence or absence and a type of a division line. More specifically, in a case where a division line is included in a camera image, outside lines at ends in the left-right direction of the plurality of lanes are identified from shapes (a dotted line, a solid line, and the like) of the division lines, and the center line is identified from the colors (yellow, white, and the like) of the division lines. Accordingly, the first lane estimation unit 171 estimates the lane in which the subject vehicle 101 is located, that is, the current lane.

Figure 6A:
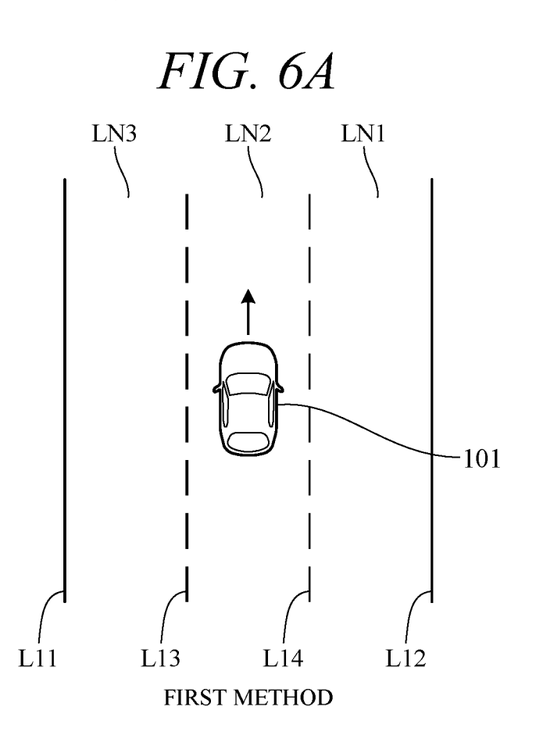
FIG. 6A is a diagram for explaining a lane estimation by a first method.

For example, in a case where only one division line of a solid line has been detected from the camera image among the division lines on the right side of the subject vehicle 101, the division line of such a solid line is identified as the outside line on a right end, and the current lane is estimated to be the first lane LN1 on the right end. In addition, as illustrated in FIG. 6A, in a case where division lines L13 and L14 of dotted lines (white) are detected between a division line L11 of a solid line (yellow) and a division line L12 of a solid line (white) from the camera image, the division lines L11 and L12 are identified as the outside lines from the shape of the division lines, and the division line L11 is identified as the center line from the color of the division line, and estimates the current lane, accordingly.

Figure 6B:
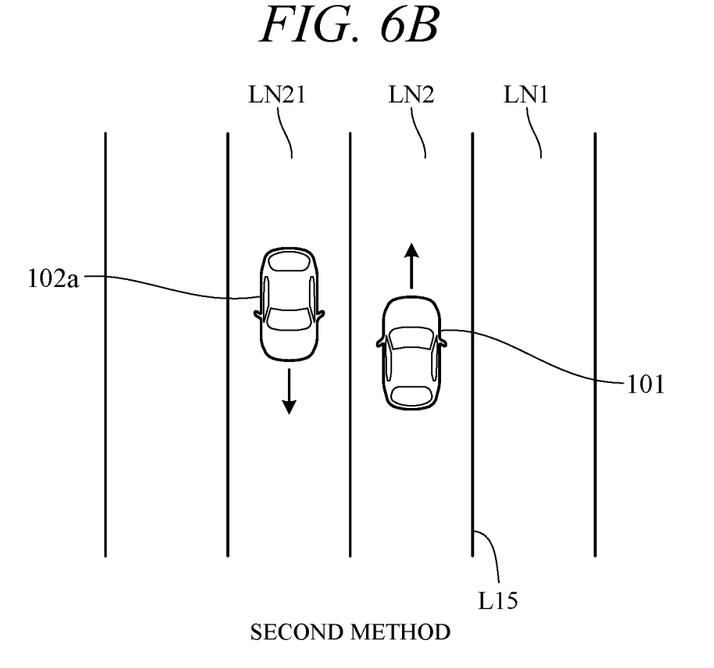
FIG. 6B is a diagram for explaining the lane estimation by a second method.

In a second method, the current lane is estimated, based on surrounding vehicle information indicating the presence or absence of a surrounding vehicle traveling in the surroundings of the subject vehicle 101 and a traveling direction of the surrounding vehicle. More specifically, the traveling direction of the surrounding vehicle is identified, by recognizing the orientation of the surrounding vehicle traveling in an adjacent lane on the left side, based on the camera image. Furthermore, the presence or absence of a surrounding vehicle traveling in an adjacent lane on the right side and the presence or absence of a division line are identified, based on the camera image. In this manner, the current lane is estimated.

For example, as illustrated in FIG. 6B, in a case where a surrounding vehicle 102a is detected in an adjacent lane LN21 on the left side of the subject vehicle 101 from the camera image, and in a case where it is determined that the orientation of the surrounding vehicle 102a is opposite to the orientation of the subject vehicle 101, it is estimated that the current lane is present on a left end (the second lane LN2). On the other hand, in a case where it is determined that the orientation of the surrounding vehicle 102a is identical to that of the subject vehicle 101, it is estimated that the current lane is not present on the left end. Furthermore, in a case where a surrounding vehicle is detected on the right side of the subject vehicle 101 from the camera image, or in a case where a division line L15, which divides a plurality of lanes, is detected as illustrated in FIG. 6B, it is estimated that the current lane is not the first lane LN1 on the right end. On the other hand, in a case where no surrounding vehicle is detected on the right side of the subject vehicle 101, and in a case where no division line that divides a plurality of lanes is detected, it is estimated that the current lane is the first lane LN1.

In a third method, the current lane is estimated, based on distance information indicating a distance from the road boundary line (such as L5 in FIG. 3) in the surroundings of the subject vehicle 101 to a division line. More specifically, a distance $\Delta W$ from the road boundary line to the division line on an inner side of the road boundary line is calculated, based on the camera image. Then, whether there is a lane between the division line and the road boundary line is determined, based on whether the distance $\Delta W$ is shorter than a predetermined value $\Delta W1$, and the current lane is estimated, accordingly. The predetermined value $\Delta W1$ corresponds to the lane width (FIG. 3) defined by laws and regulations.

Figure 6C:
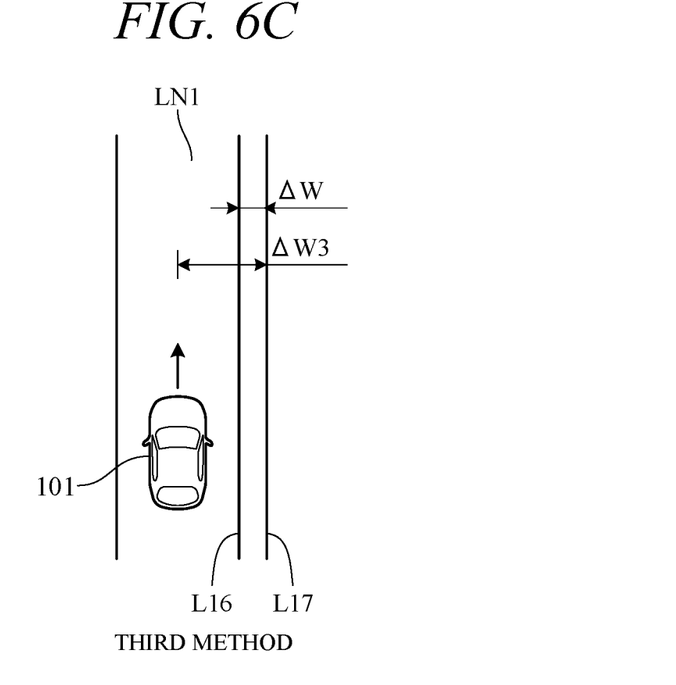
FIG. 6C is a diagram for explaining the lane estimation by a third method.
Figure 6D:
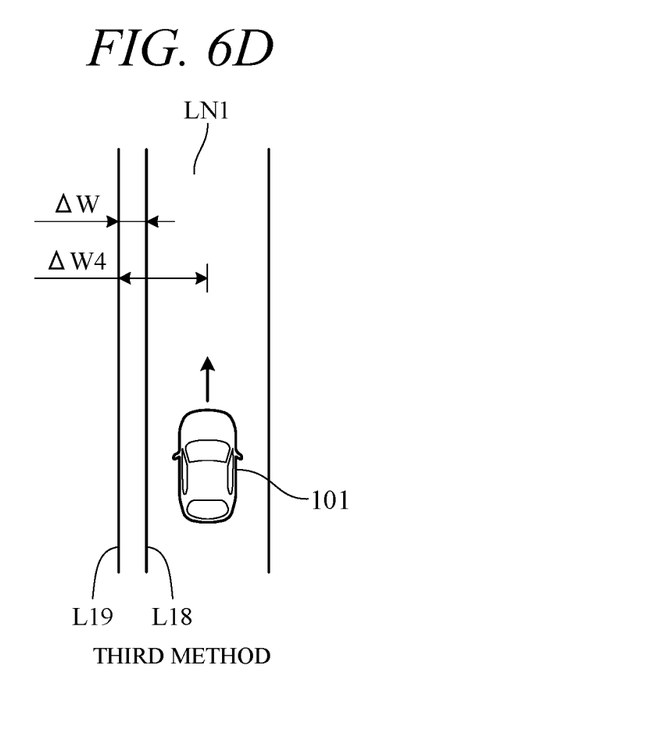
FIG. 6D is another diagram for explaining the lane estimation by the third method.

For example, as illustrated in FIG. 6C, in a case where a division line L16 is detected on the right side of the current lane from the camera image, and in a case where a road boundary line L17 (the outside line) such as a curbstone of a sidewalk is detected further on the right side, the distance $\Delta W$ between division line L16 and the road boundary line L17 is calculated, based on the camera image. Then, in a case where the distance $\Delta W$ is equal to or smaller than the predetermined value $\Delta W1$, it is estimated that the current lane is the first lane LN1 on the right end. In addition, as illustrated in FIG. 6D, in a case where a division line L18 is detected on the left side of the current lane from the camera image, and in a case where a road boundary line L19 (the outside line) such as a curbstone of a median strip is detected further on the left side, the distance $\Delta W$ between the division line L18 and the road boundary line L19 is calculated, based on the camera image. Then, in a case where the distance $\Delta W$ is equal to or shorter than the predetermined value $\Delta W1$, it is estimated that the current lane is present on the left end.

If the division line L16 on the right side (FIG. 6C) is not detected from the camera image, the first lane estimation unit 171 calculates a distance $\Delta W3$ from the subject vehicle 101 (the center of the current lane) to the road boundary line L17. Then, in a case where the distance $\Delta W3$ is equal to or smaller than a value obtained by multiplying the predetermined value $\Delta W1$ by a predetermined coefficient (for example, 1.5), it is estimated that there is no lane on the right side of the current lane and the current lane is the first lane LN1. In addition, if the division line L18 on the left side (FIG. 6D) is not detected from the camera image, the first lane estimation unit 171 calculates a distance $\Delta W4$ from the subject vehicle 101 (the center of the current lane) to the road boundary line L19. Then, in a case where the distance $\Delta W4$ is equal to or smaller than a value obtained by multiplying the predetermined value $\Delta W1$ by a predetermined coefficient (for example, 1.5), it is estimated that there is no lane on the left side of the current lane and the current lane is present on the left end.

Figure 7:
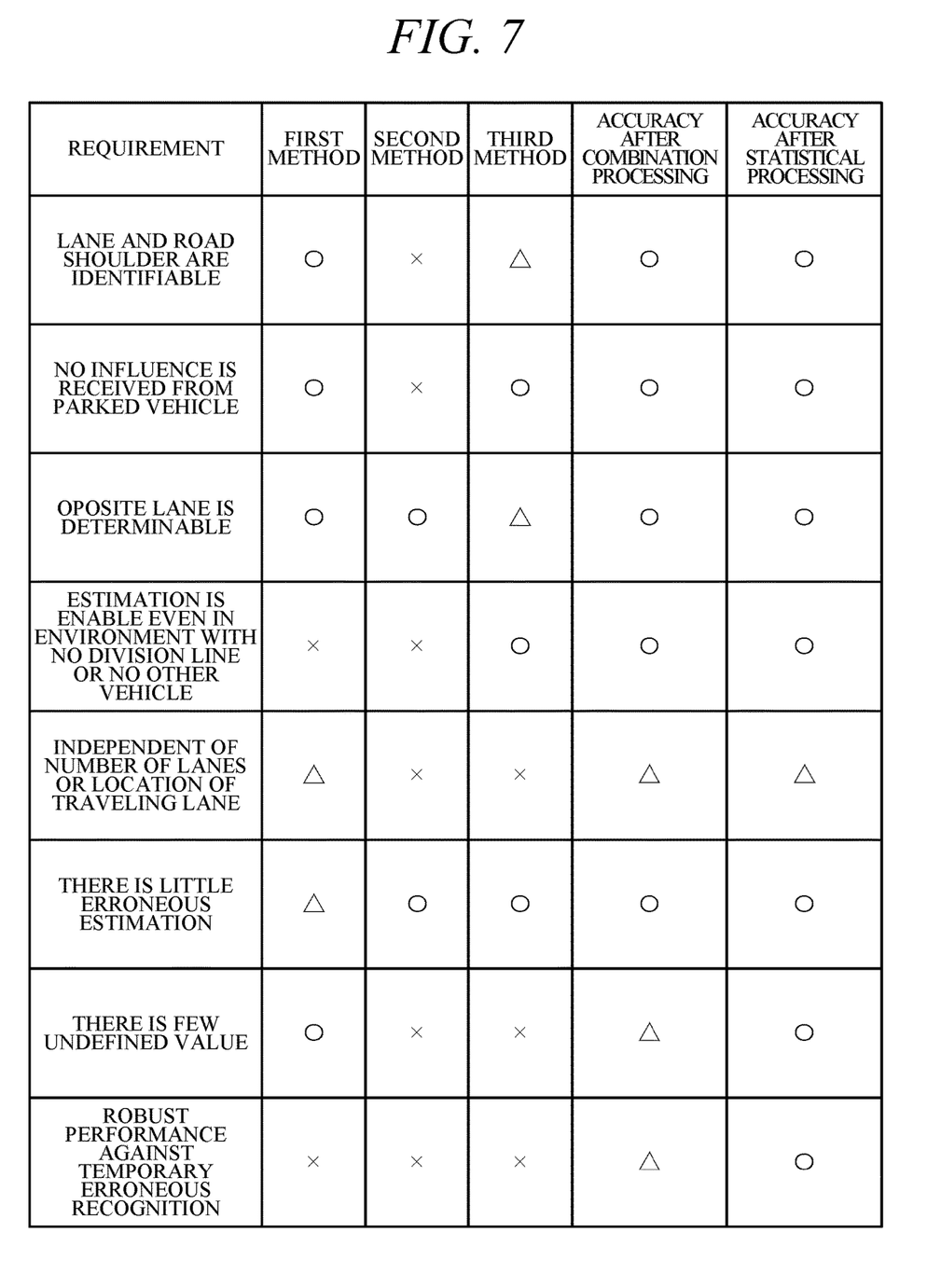
FIG. 7 is a table illustrating that there is a case that an estimation of a current lane is possible and a case that the estimation of the current lane is not possible for a plurality of requirements to be satisfied by a travel environment.

It is not always possible to estimate the current lane in the first to third methods described above, and the current lane can be accurately estimated in some cases, but cannot be accurately estimated in the other cases, depending on the travel environment. FIG. 7 is a table illustrating a relationship between the first to third methods and a plurality of requirements to be satisfied by the travel environment. Circle (○) in FIG. 7 indicates a case where the current lane can be accurately estimated, and Cross (×) indicates a case where the current lane cannot be accurately estimated. Triangle (△) indicate that the current lane can be accurately estimated in some cases, but cannot be accurately estimated in the other cases. In FIG. 7, requirements to be satisfied by the travel environment include: a lane and a road shoulder are identifiable, no influence is received from a parked vehicle, an opposite lane is determinable, estimation is enabled even in an environment with no division line or no another vehicle, independent of the number of lanes or the location of the traveling lane, there is little erroneous estimation, there is few undefined value, robust performance against temporary erroneous recognition, and the like.

The first lane estimation unit 171 estimates the current lane by using the first to third methods every predetermined time. For example, the current lane is estimated by combining the first to third methods. However, it is possible to estimate the current lane in the first to third methods in the travel environment marked with Circle (○) in FIG. 7, whereas it is not possible to estimate the current lane in the travel environment marked with Cross (×). In the travel environment marked with Triangle (Δ), it is possible or not possible to estimate the current lane depending on the case.

FIG. 7 also indicates accuracy in estimating the current lane after combination processing in which the first to third methods are combined together. The combination processing is processing of integrating estimation results in the first to third methods and calculating the current lane (will be referred to as an integrated current lane). For example, in a case where the current lane is estimated to be the first lane LN1 in any of the first to third methods, and in a case where the current lane is not estimated to be the second lane LN2 or the third lane LN3 in any of the first to third methods, the integrated current lane becomes the first lane LN1. Here, any one of the division line information, the surrounding vehicle information, and the distance information respectively used in the first to third methods is defined as first information, and the remaining two pieces of information are defined as second information and third information. In a case where the current lane estimated based on the first information is the first lane LN1, in a case where the current lane is not estimated based on the second information, and in a case where the current lane is not estimated based on the third information, the integrated current lane becomes the first lane LN1.

In a case where the current lane is estimated to be the first lane LN1 in any one of the first to third methods, and in addition, in a case where the current lane is estimated to be the second lane LN2 in another one of the first to third methods, the integrated current lane is not calculated. In other words, in a case where the current lane estimated based on the first information is the first lane LN1, in a case where the current lane estimated based on the second information is the second lane LN2, and in a case where the current lane is not estimated based on the third information, the integrated current lane is not calculated.

However, in a case where the current lane is estimated to be the first lane LN1 in any two of the first to third methods, and in a case where the current lane is estimated to be the second lane LN2 in the other one of the first to third methods, there is a high probability that the current lane is the first lane LN1. Thus, the integrated current lane becomes the first lane LN1. In other words, in a case where the current lane estimated based on the first information and the current lane estimated based on the second information are both the first lane LN1, and in a case where the current lane estimated based on the third information is the second lane LN2, the integrated current lane becomes the first lane LN1.

As illustrated in FIG. 7, in a case where it is possible to estimate the current lane in any of the first to third methods (Circle (○)), it is possible to estimate the current lane (the integrated current lane) also after the combination processing, except for some exceptions. By combining a plurality of methods in this manner, it is possible to estimate the current lane favorably in various travel environments. The estimation result of the current lane (the integrated current lane) obtained every predetermined time by the first lane estimation unit 171 is stored in the memory unit 12. For example, whenever the integrated current lane is calculated, a count value corresponding to the lane (the first lane LN1, the second lane LN2, or the third lane LN3) is counted up.

When the subject vehicle 101 reaches the end point (the intersection 302 in FIG. 3) in the predetermined section SE, the parameter calculation unit 172 statistically processes the estimation result of the current lane (the integrated current lane) every predetermined time stored in the memory unit 12, and calculates a parameter (called a lane parameter) indicating the frequency of the traveling lane. As described above, in a case where a lane corresponding to the integrated current lane is counted up whenever the integrated current lane is calculated, the count value of each lane can be used without change as the lane parameter.

Figure 8:
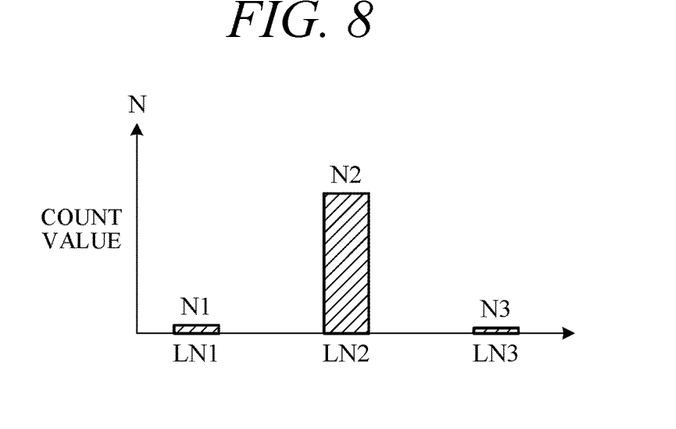
FIG. 8 is a diagram illustrating an example of a lane parameter.

FIG. 8 is a diagram illustrating an example of results of the lane parameters calculated by the parameter calculation unit 172. In FIG. 8, the frequency in FIG. 4 is replaced with count values. As illustrated in FIG. 8, a count value N2 of the second lane LN2 is larger than a count value N1 of the first lane LN1 and a count value N3 of the third lane LN3. Whenever the first lane estimation unit 171 estimates the current lane (time-based current lane) in the first to third methods without calculating the integrated current lane, the estimated lane may be counted up. For example, in a case where the current lane is estimated to be the first lane in any one of the first to third methods at a certain time, the count value of the first lane LN1 may be increased by +1, and in a case where the current lane is estimated to be the first lane LN1 in each of the first to third methods, the count value of the first lane LN1 may be increased by +3.

The second lane estimation unit 173 estimates (identifies) the current lane in the predetermined section SE, based on the lane parameter calculated by the parameter calculation unit 172. For example, as illustrated in FIG. 8, the second lane LN2 having the largest count value is estimated to be the current lane (section-based current lane). In FIG. 8, the difference in frequency (the difference in count value) between the second lane LN2 and the other lanes is large. However, in a case where the difference in frequency is small (for example, the difference in frequency is equal to or smaller than a predetermined value), only the environment map may be generated without identifying the current lane, that is, without adding the information of the lanes in the SD map illustrated in FIG. 2. In this case, when the vehicle travels again in the predetermined section SE, the coordinates of the environment map generated in the previous travel and the coordinates of the environment map generated in the current travel may be associated with each other, the current lane may be identified from the information of the camera image obtained in the current travel, and the information of the SD map may be added.

FIG. 7 also indicates accuracy in estimating of the current lane estimated in the above statistical processing. As indicated in FIG. 7, after the statistical processing, the frequency with which the current lane can be accurately estimated becomes higher than that after the combination processing. In addition, since the current lane is finally estimated by statistically processing the estimated values of the current lane in the predetermined section SE (the estimated values in the first to third methods), the estimation accuracy of the current lane becomes higher.

The map generation unit 17 generates an environment map based on the camera image, while performing such estimation processing of estimating the current lane. That is, the map generation unit 17 generates the environment map including the point cloud data by using the technique such as SLAM, as described above. The generated environment map is stored in the memory unit 12.

The information acquisition unit 174 in FIG. 5 acquires, from the map database 5, the information of the SD map corresponding to the location of the subject vehicle recognized by the subject vehicle position recognition unit 13. The information of the SD map includes information (the lane information) indicating a road structure such as branches and junctions of lanes.

The information addition unit 175 extracts information corresponding to the current lane estimated by the second lane estimation unit 173 from the lane information acquired by the information acquisition unit 174. Then, the extracted information is added to the environment map stored in the memory unit 12, and this is stored as a new environment map in the memory unit 12. Thereafter, during traveling in self-driving, the target path of the subject vehicle 101 is generated by using such an environment map. Therefore, the vehicle control system 100 is capable of controlling a traveling operation of the subject vehicle 101 favorably by predicting a branch or a junction of the current lane.

Figure 9:
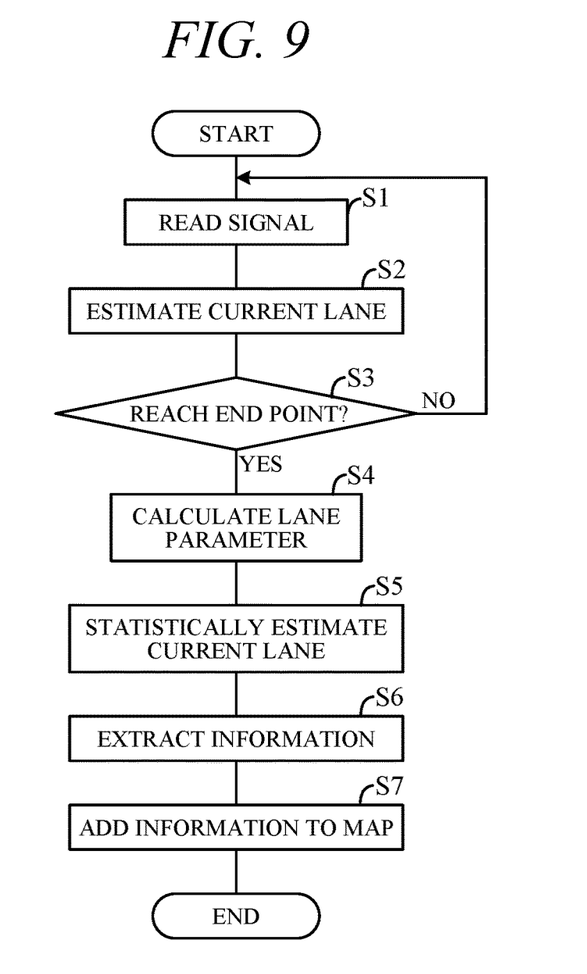
FIG. 9 is a flowchart illustrating an example of a processing executed by a controller in FIG. 5.

FIG. 9 is a flowchart illustrating an example of processing performed by the controller 10 (CPU) in FIG. 5 in accordance with a program stored in the memory unit. The processing illustrated in this flowchart is performed when the subject vehicle 101 travels in the predetermined section SE in FIG. 2. Therefore, the processing is started when the subject vehicle 101 reached the start point of the predetermined section SE (the intersection 301 in FIG. 2), in a case where the map generation unit 17 generates the environment map while the subject vehicle 101 travels along a road in the manual drive mode.

As illustrated in FIG. 9. First, in S1 (S: processing step), the CPU reads signals from the camera 1a and the map database 5. The signal read from the map database 5 includes information on lanes corresponding to the current location of the subject vehicle 101, that is, information on a road structure such as branches and junctions of lanes ahead of the current location of the subject vehicle 101. The current location of the subject vehicle 101 can be detected by using signal from the position measurement unit 4, for example.

Next, in S2, the CPU estimates the current lane in which the subject vehicle 101 is traveling based on the camera image. More specifically, first, the CPU estimates the current lane (time-based current lane) by each of the first to third methods described above. Next, the CPU combines results by the first to third methods and estimates the current lane after the combination processing. In other words, the CPU calculates an integrated current lane (time-based integrated current lane) by integrating the estimation results in the first to third methods. The calculation results are stored in the memory unit 12.

Next, in S3, the CPU determines whether the subject vehicle 101 reaches the end point of the predetermined section SE (the intersection 302 in FIG. 2). If an affirmative decision is made in S3, the processing proceeds to S4, while if a negative decision is made, the processing returns to S1. Therefore, the calculation of the integrated current lane is repeated every predetermined time (for example, several microseconds or several milliseconds) until the subject vehicle 101 reaches the end point of the predetermined section SE, and the calculation results are stored in the memory unit 12. Apart from the above processing, the CPU generates the environment map based on the camera image, and the generated environment map is stored in the memory unit 12 as needed.

In S4, the CPU calculates a lane parameter by using information of the calculation results of the integrated current lane stored in the memory unit 12. More specifically, the CPU calculates the count value of each lane (N1 to N3 in FIG. 8) counted up every the calculation of the integrated current lane without changing as the lane parameter.

Next, in S5, the CPU statistically estimates the current lane by using the lane parameter calculated in S4. More specifically, the CPU estimates the lane having the largest count value among the count values N1 to N3 of respective lanes LN1 to LN3 as the current lane (section-based current lane). However, when the difference between the count values of the lanes is small, the statistical estimation of the current lane is not performed.

Next, in S6, the CPU extracts information of the road structure corresponding to the current lane estimated in S5, from the lane information of the map database 5 read in S1.

Next, in S7, the CPU adds the information of the road structure extracted in S6 to the environment map in the predetermined section SE stored in the memory unit 12, and stores the information in the memory unit 12 as a new environment map. Thus, the processing of the map generation in the predetermined section SE is completed.

The environment map is generated by adding the information of the road structure as described above. Thus, while the vehicle is traveling in accordance with the self-driving using the environment map, it is possible to notify the occupant beforehand via the input and output device 3 (for example, a monitor display or a sound output from a speaker) that the lane change is planned at a branch or a junction. In this case, it is preferable to notify immediately before a location point where the road structure changes. Accordingly, uncomfortable feeling for the occupant can be reduced. On the other hand, while the subject vehicle 101 is traveling in accordance with the manual driving, it is sufficient to notify the driver beforehand via the input and output device 3 that it is necessary to change lanes at a branch or a junction. Accordingly, the driver is able to make a lane change with enough time.

Figure 10A:
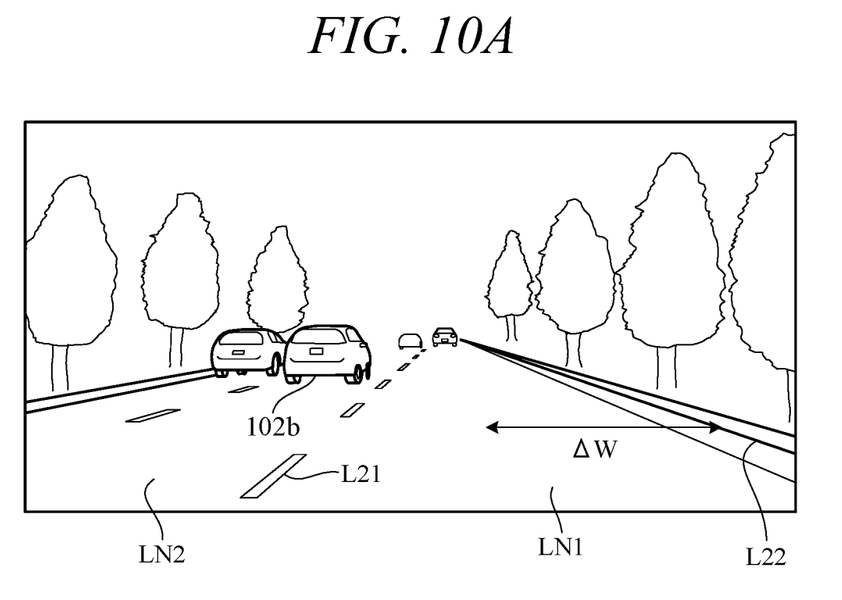
FIG. 10A is a diagram illustrating an example of an operation by the lane estimation apparatus according to the present embodiment.
Figure 10B:
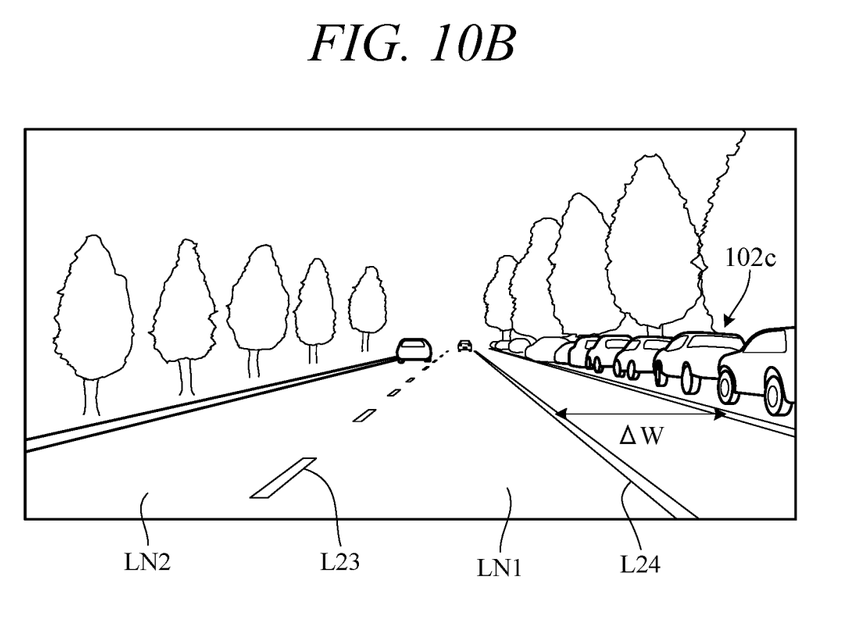
FIG. 10B is a diagram illustrating another example of an operation by the lane estimation apparatus according to the present embodiment.

The operation of the lane estimation apparatus according to the present embodiment will be described more specifically. FIGS. 10A and 10B are each a diagram illustrating an example of a travel scene to which the lane estimation apparatus is applied, and corresponds to an image captured by the camera 1a while the subject vehicle 101 is traveling.

In FIG. 10A, a division line L21 of a dotted line is detected on the left side of the subject vehicle 101 from the camera image, but no solid division line in white or yellow is detected. Therefore, the outside line or the center line is unknown, and it is not possible to estimate the current lane in the first method.

In addition, another vehicle 102b is detected on the left side of the subject vehicle 101 from the camera image, but the orientation of the other vehicle 102b is identical to the orientation of the subject vehicle 101, and the position of the opposite lane is unknown. On the other hand, neither a division line nor a vehicle is detected on the right side of the subject vehicle 101 from the camera image. Therefore, the current lane is estimated to be the first lane LN1 on the right end in the second method.

Further, a road boundary line L22 is detected on the right side of the subject vehicle 101 from the camera image, and the distance $\Delta W$ between the subject vehicle 101 and the road boundary line L22 is equal to or smaller than a value obtained by multiplying the predetermined value ΔW1 by a predetermined coefficient (for example, 1.5). Therefore, the current lane is estimated to be the first lane LN1 on the right end in the third method. As described above, the integrated current lane becomes the first lane LN1, and the count value N1 of the first lane LN1 is counted up. As a result, after completion of traveling in the predetermined section SE, it is estimated that the current lane is the first lane LN1 in the statistical processing.

In FIG. 10B, a dotted division line L23 is detected on the left side of the subject vehicle 101 from the camera image, and a division line L24 of a solid line (white) is detected on the right side. Therefore, the current lane is estimated to be the first lane LN1 on the right end in the first method.

In addition, the division line L24 and a plurality of other vehicles 102c are detected on the right side of the subject vehicle 101 from the camera image. However, it is not possible to identify that the other vehicles 102c are parked on a road shoulder. Furthermore, no oncoming vehicle that is opposite in orientation to the subject vehicle 101 is detected on the left side of the subject vehicle 101. Therefore, it is not possible to estimate the current lane in the second method.

Furthermore, the distance ΔW between the division line L24 on the right side of the subject vehicle 101 and the road boundary line on its right side, that have been detected from the camera image, is longer than the predetermined value ΔW1. However, it is not possible to identify that an area indicated by the distance ΔW is a road shoulder. Therefore, it is not possible to estimate the current lane in the third method. As described above, the integrated current lane becomes the first lane LN1, and the count value N1 of the first lane LN1 is counted up. As a result, after completion of traveling in the predetermined section SE, it is estimated that the current lane is the first lane LN1 in the statistical processing.

In FIG. 10A, the current lane is estimated to be the first lane LN1 in two methods (the second and third methods), whereas in FIG. 10B, the current lane is estimated to be the first lane LN1 in one method (the first method). Therefore, it is considered that the estimation result in FIG. 10A is more reliable than the estimation result in FIG. 10B. In consideration of this point, the lane parameter (the count value N1) calculated in FIG. 10A may be made larger than the lane parameter (the count value N1) calculated in FIG. 10B. For example, instead of estimating the integrated current lane, the count value of the corresponding lane may be increased whenever the current lane is estimated in the first to third methods.

According to the above embodiments, the following operations and effects are achievable.

(1) The lane estimation apparatus includes: the camera 1a, which detects an external circumstance in the surroundings of the subject vehicle 101; and the first lane estimation unit 171, the parameter calculation unit 172, and the second lane estimation unit 173, which serve as the lane estimation unit configured to estimate a current lane in which the subject vehicle 101 is traveling, based on information of the external circumstance detected by the camera 1a (FIG. 5). When the subject vehicle 101 travels in the predetermined section SE, the lane estimation unit estimates the current lane (time-based current lane) every predetermined time, calculates a lane parameter indicating the frequency of the current lane after completion of traveling in the predetermined section SE, and estimates the current lane (section-based current lane) in which the subject vehicle 101 has traveled in the predetermined section SE, based on the lane parameter (FIG. 9). In this manner, by estimating the current lane based on the lane parameter indicating the frequency of the current lane in the predetermined section SE, even in a case where the current lane is erroneously estimated temporarily, the current lane can be accurately estimated without its estimation result being largely influenced. Therefore, it is possible to estimate the current lane favorably under various travel environments.

(2) The information of the external circumstance detected by the camera 1a includes: the division line information indicating the presence or absence and the type of the division line; the surrounding vehicle information indicating the presence or absence and a traveling direction of a surrounding vehicle that is traveling in the surroundings of the subject vehicle 101; and the distance information indicating a distance from a road boundary line to the division line. The lane estimation unit (the first lane estimation unit 171) estimates the current lane every predetermined time, based on the division line information, the surrounding vehicle information, and the distance information. Accordingly, the current lane is estimated in a plurality of methods (the first to third methods), and thus the current lane corresponding to all travel environments can be estimated.

(3) The lane estimation apparatus further includes the memory unit 12, which stores information (FIG. 5). The lane estimation unit estimates the current lane of the subject vehicle 101 every predetermined time from a start point to an end point in the predetermined section SE, which is set along a road, stores an estimation result in the memory unit 12, and calculates a lane parameter indicating the frequency of the current lane, based on information of the estimation result stored in the memory unit 12, when the subject vehicle 101 reaches the end point (FIG. 9). Accordingly, it is possible to estimate the current lane favorably by using statistical processing.

(4) The map generation apparatus 50 includes: the above-described lane estimation apparatus; and the map generation unit 17, which generates a map of the surroundings of the subject vehicle 101, based on the external circumstance detected by the camera 1a (FIG. 5). Accordingly, it is possible to grasp the lane corresponding to the map while generating the map.

(5) The map generation apparatus 50 further includes: the memory unit (the map information memory unit) 12, which stores the map information generated by the map generation unit 17; and the information acquisition unit 174, which acquires road map information including information of the number of lanes and information of a branch and a junction of lanes corresponding to the map information stored in the memory unit 12 (FIG. 5). The map generation unit 17 (the information addition unit 175) adds information of the road structure identified by the road map information that has been acquired by the information acquisition unit 174 to the information of the map stored in the memory unit 12 (FIG. 9). Accordingly, the lane information included in the SD map or the like can be added to the environment map obtained by the technique such as SLAM, and the accurate environment map including the lane information can be generated. As a result, it is possible to travel with the self-driving favorably on a road with a branch and a junction of lanes.

The above embodiment can be varied into various forms. Several modifications will be described below. In the above embodiment, the external circumstance around the subject vehicle 101 is detected (recognized) by the external sensor group 1 such as a camera 1a. However, as long as being configured to detect a division line or detect a presence or absence of other vehicle, or the like, an external circumstance detection part (an external circumstance recognition part) such as a LIDAR other than the camera 1a may be used.

In the above embodiment, the parameter calculation unit 172 calculates the number of times (count values N1 to N3) for each lane estimated to be the current lane (integrated current lane) in the processing of estimating the current lane every predetermined time by the first lane estimation unit 171, as a lane parameter. However, other parameter indicating frequency of the lanes estimated may be calculated. In the above embodiment, the second lane estimation unit 173 estimates the lane having the largest lane parameter (N1 to N3), that is, the lane having the most frequent value, as the current lane. However, the current lane in the predetermined section SE may be estimated by obtaining the frequency of the current lane by various statistical processes other than the above processing based on the parameter. Therefore, a configuration of a lane estimation unit is not limited to the one described above.

In the above embodiment, the first lane estimation unit 171 estimates the current lane at predetermined time interval based on the division line information indicating the presence or absence of the division line and the type of the division line, the surrounding vehicle information indicating the presence or absence of the surrounding vehicle traveling around the subject vehicle and the traveling direction of the surrounding vehicle, and the distance information indicating the distance from the road boundary line to the division line. That is, although the integrated current lane in which the current lane estimated based on the division line information, the current lane estimated based on the surrounding vehicle information, and the current lane estimated based on the distance information are integrated is estimated every predetermined time, the current lane may be estimated based on one or two information among the three information (the first information, the second information, and the third information) or based on at least one information among the three information and other information. In other words, the current lane may be estimated based on the first information, the current lane may be estimated based on the first information and the second information, and the current lane may be estimated based on the first information, the second information, and the third information. In the above embodiment, the current lane is estimated on the assumption that the subject vehicle 101 does not change the lane within the predetermined section SE, but when lane change is performed, the current lane may be estimated in the same manner before and after the lane change is performed. In the above embodiment, the plurality of lanes including the current lane are the first lane LN1, the second lane LN2, and the third lane LN3. However, the number of lanes is not limited to those described above. The positional relation between the first lane LN1 and the second lane LN2 is not also limited to those described above, and the first lane LN1 may be located on the left side of the second lane LN2, and the first lane LN1 and the second lane LN2 may not be adjoined with each other.

In the above embodiment, the information acquisition unit 174 acquires road map information including lane information such as branching and joining of lanes, but the information acquisition unit may acquire other road map information. For example, the information acquisition unit may acquire information indicating the traveling direction of the lane, that is, information such as a straight-ahead dedicated lane, a left-turn dedicated lane, and a right-turn dedicated lane, and then the acquired information may be added to an environment map and such an environment map may be stored.

The present invention can also be used as a lane estimation method including detecting an external circumstance around a subject vehicle, and estimating a current lane in which the subject vehicle travels, based on the external circumstance detected, wherein the estimating includes estimating a time-based current lane every a predetermined time when the subject vehicle travels in a predetermined section, calculating a parameter indicating a frequency of the time-based current lane after traveling of the subject vehicle in the predetermined section, and estimating the current lane in which the subject vehicle has traveled in the predetermined section, based on the parameter.

The above embodiment can be combined as desired with one or more of the above modifications. The modifications can also be combined with one another.

According to the present invention, it is possible to accurately estimate a traveling lane of a subject vehicle.

Above, while the present invention has been described with reference to the preferred embodiments thereof, it will be understood, by those skilled in the art, that various changes and modifications may be made thereto without departing from the scope of the appended claims.

What is claimed is:
1. A vehicle control system, comprising:
a camera detecting an external circumstance around a subject vehicle;
an actuator for traveling; and
an electronic control unit including a microprocessor and a memory connected to the microprocessor, wherein
the microprocessor is configured to perform
outputting a control signal to the actuator based on the external circumstance detected by the camera,
estimating a current lane in which the subject vehicle travels, based on the external circumstance detected by the camera, and
the estimating including estimating a time-based current lane every predetermined time when the subject vehicle travels in a predetermined section, calculating a parameter indicating a frequency of the time-based current lane after traveling of the subject vehicle in the predetermined section, and estimating the current lane in which the subject vehicle has traveled in the predetermined section, based on the parameter,
information on the external circumstance detected by the camera includes division line information indicating a presence or absence of a division line and a type of the division line, surrounding vehicle information indicating a presence or absence of a surrounding vehicle traveling in a surrounding of the subject vehicle and a traveling direction of the surrounding vehicle, and distance information indicating a distance from a road boundary line to the division line, and
the microprocessor is configured to perform
the estimating further including estimating the time-based current lane every predetermined time, based on the division line information, the surrounding vehicle information, and the distance information.

2. The vehicle control system according to claim 1, wherein the microprocessor is configured to perform the estimating including estimating the time-based current lane every predetermined time while the subject vehicle travels from a start point to an end point of the predetermined section set along a road, the memory is configured to store information on an estimation result of the time-based current lane, and the microprocessor is configured to perform when the subject vehicle reaches the end point, the estimating including calculating the parameter based on the information on the estimation result stored in the memory.

3. The vehicle control system according to claim 1, wherein the camera is configured to image the division line on a road in a traveling direction of the subject vehicle and the surrounding vehicle, and the microprocessor is configured to perform the estimating including estimating the current lane based on an image captured by the camera.

4. The vehicle control system according to claim 1, wherein the time-based current lane estimated every predetermined time is an integrated current lane obtained by integrating a first time-based current lane estimated based on the division line information, a second time-based current lane estimated based on the surrounding vehicle information, and a third time-based current lane estimated on the distance information, and the microprocessor is configured to perform the estimating including calculating a frequency of the integrated current lane as the parameter after the subject vehicle travels in the predetermined section.

5. The vehicle control system according to claim 1, wherein the current lane is any of a plurality of lanes including a first lane and a second lane, and the microprocessor is configured to perform the estimating including calculating a first number of times estimated that the time-based current lane is the first lane every predetermined time and a second number of times estimated that the time-based current lane is the second lane every predetermined time, as the parameter, and estimating that a lane where the parameter is maximum is the current lane.

6. The vehicle control system according to claim 1, wherein the microprocessor is configured to further perform generating a map around the subject vehicle based on the external circumstance detected by the camera.

7. The vehicle control system according to claim 6, wherein the memory is configured to store information on the map generated, the microprocessor is configured to further perform acquiring road map information including information on a number, and a branch and a junction of the lanes corresponding to the information on the map stored in the memory, and the generating including adding information on a road structure identified by the road map information acquired to the information on the map stored in the memory.

8. A vehicle control system, comprising:

detecting an external circumstance around a subject vehicle;

outputting a control signal to an actuator for traveling based on the external circumstance detected; and estimating a current lane in which the subject vehicle travels, based on the external circumstance detected, wherein the estimating includes estimating a time-based current lane every predetermined time when the subject vehicle travels in a predetermined section, calculating a parameter indicating a frequency of the time-based current lane after traveling of the subject vehicle in the predetermined section, and estimating the current lane in which the subject vehicle has traveled in the predetermined section, based on the parameter, information on the external circumstance includes division line information indicating a presence or absence of a division line and a type of the division line, surrounding vehicle information indicating a presence or absence of a surrounding vehicle traveling in a surrounding of the subject vehicle and a traveling direction of the surrounding vehicle, and distance information indicating a distance from a road boundary line to the division line, and the estimating further includes estimating the time-based current lane every predetermined time, based on the division line information, the surrounding vehicle information and the distance information.

9. The vehicle control system according to claim 6, wherein the subject vehicle is a self-driving vehicle, and the microprocessor is configured to perform the outputting including outputting the control signal to the actuator so that the subject vehicle travels by self-driving based on information of the map.

10. The vehicle control system according to claim 1, wherein the subject vehicle is a self-driving vehicle, and the microprocessor is configured to further perform outputting a control signal to a display or a speaker mounted on the subject vehicle so as to notify an occupant that a lane change of the subject vehicle is planned during traveling in self-driving.

11. The vehicle control system according to claim 1, wherein the microprocessor is configured to further perform outputting a control signal to a display or a speaker mounted on the subject vehicle so as to notify a driver that a lane change of the subject vehicle is planned at a branch or a junction.

\* \* \* \* \*